US012486970B2

(12) United States Patent
Jones

(10) Patent No.: US 12,486,970 B2
(45) Date of Patent: Dec. 2, 2025

(54) SYSTEMS AND METHODS TO MAGNETICALLY ATTACH A LIGHTING FIXTURE TO A NICHE CABINET

(71) Applicant: Illuminiche, Silver Creek, GA (US)

(72) Inventor: William Jones, Silver Creek, GA (US)

(73) Assignee: Illuminiche, Silver Creek, GA (US)

( * ) Notice: Subject to any disclaimer, the term of this patent is extended or adjusted under 35 U.S.C. 154(b) by 0 days.

(21) Appl. No.: 19/276,140

(22) Filed: Jul. 22, 2025

(65) Prior Publication Data

US 2025/0347400 A1 Nov. 13, 2025

Related U.S. Application Data

(63) Continuation-in-part of application No. 18/330,419, filed on Jun. 7, 2023, now abandoned.

(51) Int. Cl.

| | |
|---|---|
| ***F21V 21/096*** | (2006.01) |
| ***F21S 8/02*** | (2006.01) |
| ***F21V 21/08*** | (2006.01) |
| ***F21V 23/02*** | (2006.01) |
| ***F21V 23/04*** | (2006.01) |
| ***F21V 33/00*** | (2006.01) |
| ***F21W 131/301*** | (2006.01) |
| ***F21Y 115/10*** | (2016.01) |

(52) U.S. Cl.
CPC ............ *F21V 21/096* (2013.01); *F21S 8/024* (2013.01); *F21V 21/0808* (2013.01); *F21V 23/02* (2013.01); *F21V 23/04* (2013.01); *F21V 33/0012* (2013.01); *F21V 33/004* (2013.01); *F21W 2131/301* (2013.01); *F21Y 2115/10* (2016.08)

(58) Field of Classification Search
CPC ........ F21S 8/02–024; F21V 21/08–096; F21V 23/02–04; F21V 33/0012–004; F21W 2131/301; F21Y 2115/10
See application file for complete search history.

(56) References Cited

U.S. PATENT DOCUMENTS 8,668,361 B2 * 3/2014 Hasnain .................. F21V 29/10
362/126

* cited by examiner

*Primary Examiner* — Jason M Han
(74) *Attorney, Agent, or Firm* — Briggs Intellectual Property Law; Jeremy A. Briggs

(57) ABSTRACT

A system including a magnetic strip and a lighting fixture is disclosed. The magnetic strip may have a front surface and a back surface. The back surface may include an attachment mechanism. The back surface may be attached to a wall of a cabinet associated with a niche assembly, via the attachment mechanism. The lighting fixture may include a magnetic or ferrous surface. The magnetic or ferrous surface may magnetically couple with the front surface of the magnetic strip.

19 Claims, 8 Drawing Sheets

SYSTEMS AND METHODS TO MAGNETICALLY ATTACH A LIGHTING FIXTURE TO A NICHE CABINET

CROSS-REFERENCE TO RELATED APPLICATION

The present application is a continuation-in-part application of U.S. application Ser. No. 18/330,419, filed Jun. 7, 2023, which is hereby incorporated by reference herein in its entirety.

TECHNICAL FIELD

The present disclosure relates to a niche assembly, and more specifically to a shower niche assembly with a removable lighting fixture.

BACKGROUND

Homeowners typically customize their homes according to their requirements and design preferences. For example, some homeowners model or insert niches into walls to customize wall appearance. A niche is a recessed portion in a wall in which a user can place one or more objects, e.g., decorative items, utility items, etc.

Homeowners also model or insert niches into their shower walls to store soaps, shampoos, conditioners, etc. Modern shower niches enable the homeowners to customize niche appearance by installing lighting fixtures, customizing niche color, design, and/or the like. Installing and customizing shower niches may be challenging as shower niches typically experience higher moisture levels and damp environment, as compared to niches installed in other parts of the home.

Thus, there is a need for a shower niche assembly that may be easily installed and may withstand moisture and damp environment.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
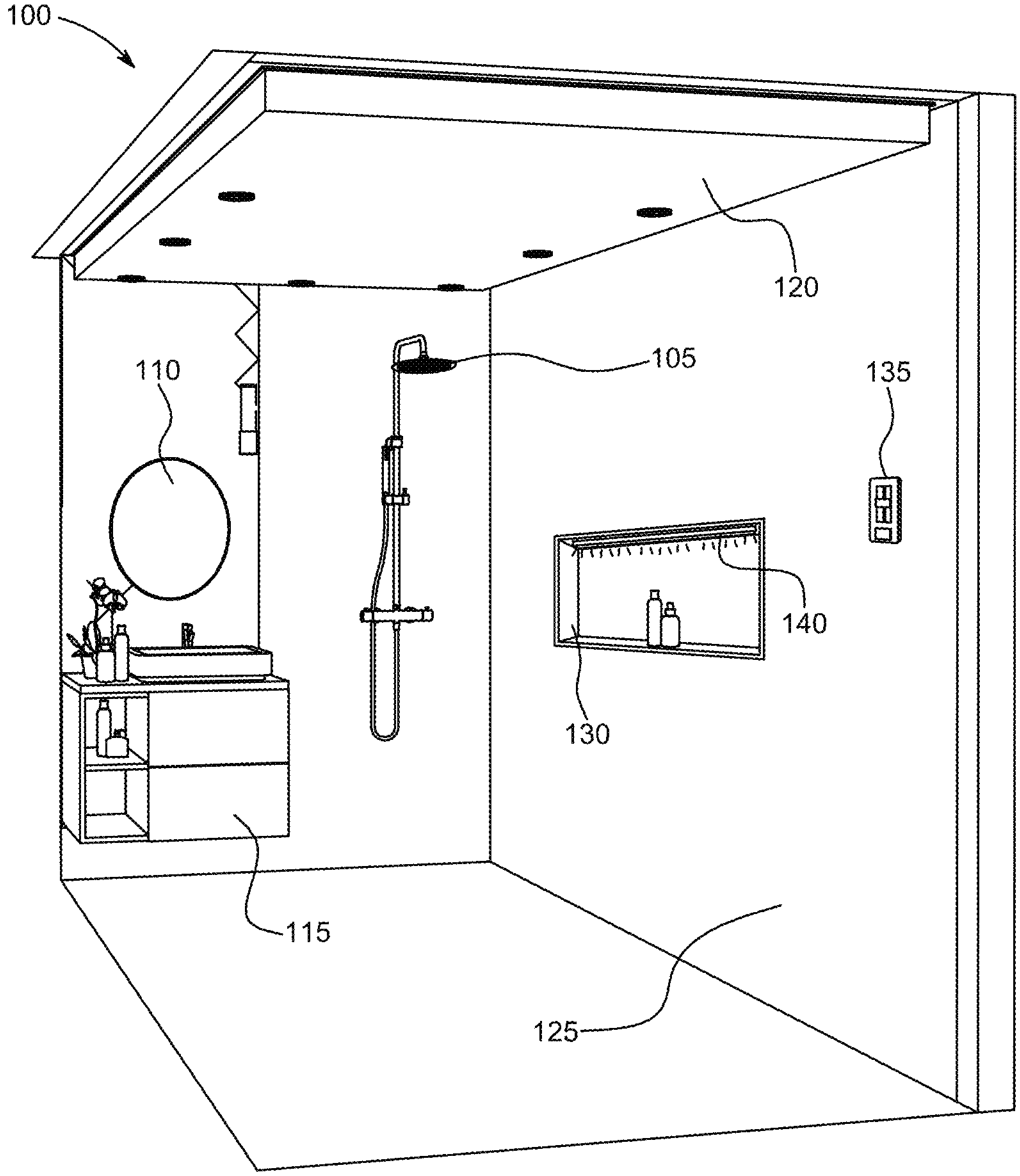
FIG. 1 depicts an example environment in which techniques and structures for providing the systems and methods disclosed herein may be implemented.

The present disclosure is directed towards a niche assembly, specifically towards a shower niche assembly with a lighting fixture. The niche assembly may include a cabinet, the lighting fixture and a switch configured to control lighting fixture operation. The cabinet may be a rectangular frame (or any other shaped frame) that may be affixed to a recess in a wall. The lighting fixture may be removably attached to one or more cabinet walls and may include a light emitting diode (LED) or an array of LEDs. The switch may include a control unit and a built-in transformer. The switch may be configured to receive high-voltage AC power from an external power source (e.g., a utility power source) and convert the high-voltage AC power into low-power DC power by using the built-in transformer. The switch may be further configured to feed the low-power DC power to the lighting fixture, thus enabling lighting fixture illumination. The control unit may enable a user to control lighting fixture activation (e.g., switch ON or OFF the LEDs), lighting fixture illumination intensity, and/or LED temperature or color.

In some aspects, the lighting fixture may be removably attached to the cabinet wall via a magnetic attachment mechanism. In this case, a lighting fixture surface and a cabinet wall surface may include magnetic material/substrate or ferrous metal that may enable magnetic attachment between the lighting fixture and the cabinet wall. Specifically, in this case, the lighting fixture may be removably attached to the cabinet wall via a magnetic strip. The magnetic strip may be rectangular in shape, and may include a front surface and a back surface. The back surface may include an adhesive that may enable attachment between the magnetic strip's back surface and the cabinet wall. Further, a back surface of the lighting fixture may be coated with a magnetic or ferrous material, which may enable magnetic attachment between the lighting fixture's back surface and the magnetic strip's front surface. The magnetic strip may be non-corrosive and comprised of a double sided water-proof adhesive tape.

In some aspects, the magnetic strip may additionally include one or more induction pads and the lighting fixture may include one or more induction receivers. The induction pads and the induction receivers may include conductor coils, which may enable power transfer via induction between the induction pads and the induction receivers. In this case, the induction pads may be connected with a utility power source, which may provide electric power to the induction pads. The induction pads may transfer the electric power wirelessly via induction to the induction receivers, thereby enabling activation of the lighting fixture. It may be appreciated that since the lighting fixture receives electric power wirelessly via induction, the lighting fixture is not required to have any wires (which makes the assembly easier to handle, install and/or operate).

In an embodiment where wires transfer power to the lighting fixture, the niche assembly may include a clip-in plug that may be inserted into a top wall of the cabinet.

Further, in this case, the lighting fixture may include a receiving plug disposed at a top portion of the lighting fixture. The receiving plug may mate with the clip-in plug. The wire may pass through the clip-in plug and into the receiving plug, thereby enabling transfer of power to the lighting fixture.

The lighting fixture may be attached to one or more cabinet sidewalls, top wall, bottom wall, and/or back wall. In some aspects, the cabinet back wall may be semi-opaque or translucent and the lighting fixture may be attached at a back portion or "behind" the cabinet back wall. In this case, the lighting fixture may illuminate an entire cabinet back wall area or a portion of the cabinet back wall area, when the lighting fixture may be illuminated via the control unit.

The present disclosure discloses a shower niche assembly with lighting. Since the switch of the niche assembly includes a built-in transformer, the user may not be required to install a separate driver or transformer to convert AC power to DC power. In this manner, the present disclosure saves installation space and cost. Further, the lighting fixture may be removably and magnetically attached to the cabinet, thus enabling the user to conveniently customize niche assembly appearance as per user's requirements or preferences.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may be in a home, a hotel, a commercial building, and/or the like. In an exemplary aspect depicted in FIG. 1, the environment 100 is a shower. Hereinafter, the environment 100 is referred to as shower 100. The present disclosure is not limited to being implemented only in the shower and the present disclosure may be implemented in any part of a commercial or a residential building.

The shower 100 may include one or more units including, but not limited to, a shower panel 105, a mirror 110, a storage cabinet 115, a ceiling 120, sidewalls 125, a shower niche assembly including a cabinet 130 and a switch 135, and/or the like. In some aspects, the shower niche assembly may be installed or inserted into the sidewall 125, as shown in FIG. 1.

A person ordinarily skilled in the art may appreciate that a shower niche is a recessed portion in a wall (e.g., the sidewall 125) into which a niche cabinet (e.g., the cabinet 130) may be inserted. A user or homeowner may place soaps, shampoos, conditioners, and/or the like, in the cabinet 130. In the exemplary aspect depicted in FIG. 1, the cabinet 130 is rectangular. In other aspects (not shown), the cabinet 130 may have any other shape, e.g., square, rectangular, hexagonal, etc.

The cabinet 130 may be installed with one or more lighting fixtures 140 that may illuminate the cabinet 130. The lighting fixture 140 may include one or more Light Emitting Diodes (LEDs) that may be configured to illuminate when a Direct Current (DC) power may be applied to the lighting fixture 140. In some aspects, the LEDs may be configured to illuminate with different intensities, colors, etc., based on inputs provided by the user.

In the exemplary aspect depicted in FIG. 1, the lighting fixture 140 is attached to a cabinet top wall. In other aspects (not shown), the lighting fixture 140 may be attached to cabinet sidewalls, a bottom wall, entire back wall or a portion of back wall, and/or the like. Further, the cabinet back wall may be opaque, semi-opaque or transparent/translucent, based on user requirements and design preferences for the shower niche.

The cabinet 130, the lighting fixture 140 and the switch 135 may collectively form the shower niche assembly. Although the switch 135 is shown to be installed in the shower area in FIG. 1, it is to be noted that the switch 135 cannot be installed in the shower area or any area that is wet. The switch 135 may be installed on any dry surface in the vicinity of the shower area or any bank of wall switches in an area that does not get wet. The user may control lighting fixture activation, illumination intensity, illumination color (warm and cool temperature lighting), and/or the like via the switch 135.

The lighting fixture 140 may be electrically coupled with the switch 135 via one or more wires (not shown in FIG. 1). The switch 135 may be configured to receive Alternating Current (AC) power supply from a utility power source and convert the AC power to DC power that may be fed to the lighting fixture 140 to illuminate the LEDs. In some aspects, the switch 135 may include a built-in transformer (or a driver/converter, not shown in FIG. 1) that may be configured to convert and step-down the received AC power to DC power. Since the switch 135 includes the built-in transformer, a contractor installing the shower niche assembly in the shower 100 may not be required to install a separate transformer in between the switch 135 and the lighting fixture 140, thus enhancing ease of installation.

Further, a person ordinarily skilled in the art may appreciate that a conventional transformer may be bulky and may not withstand moisture or damp environment. Therefore, the conventional transformer is typically installed in home basement, attic, or any other location away from the shower 100. By integrating the transformer to the switch 135, the present disclosure saves installation space (as separate installation location for the transformer may not be required) and cost by minimizing usage of wires (as wires connecting the switch 135 to the transformer may not be required). In this manner, the present disclosure saves cost and installation space, in addition to enhancing ease of installation for the contractor.

To further enhance ease of installation, the cabinet 130 and the lighting fixture 140 may be removably attached to each other via magnetic attachment means, e.g., a magnetic strip. Specifically, to install (or uninstall) or move the lighting fixture 140 within the cabinet 130, the contractor may be required to bring the lighting fixture 140 in proximity to the cabinet 130, and magnetic coupling between the cabinet 130 and the lighting fixture 140 may enable their secure attachment. In this case, the cabinet 130 may include magnetic attachment mechanism (not shown in FIG. 1) on one or more cabinet walls. Lighting fixture back surface too may include magnetic attachment mechanism or ferrous metal that may magnetically couple with the magnetic attachment mechanism of the cabinet 130.

Magnetic attachment mechanism between the cabinet 130 and the lighting fixture 140 is described below later in conjunction with FIGS. 5 and 7. Furthermore, structural and functional details of the shower niche assembly are described below in conjunction with FIGS. 2-4.

Figure 2:
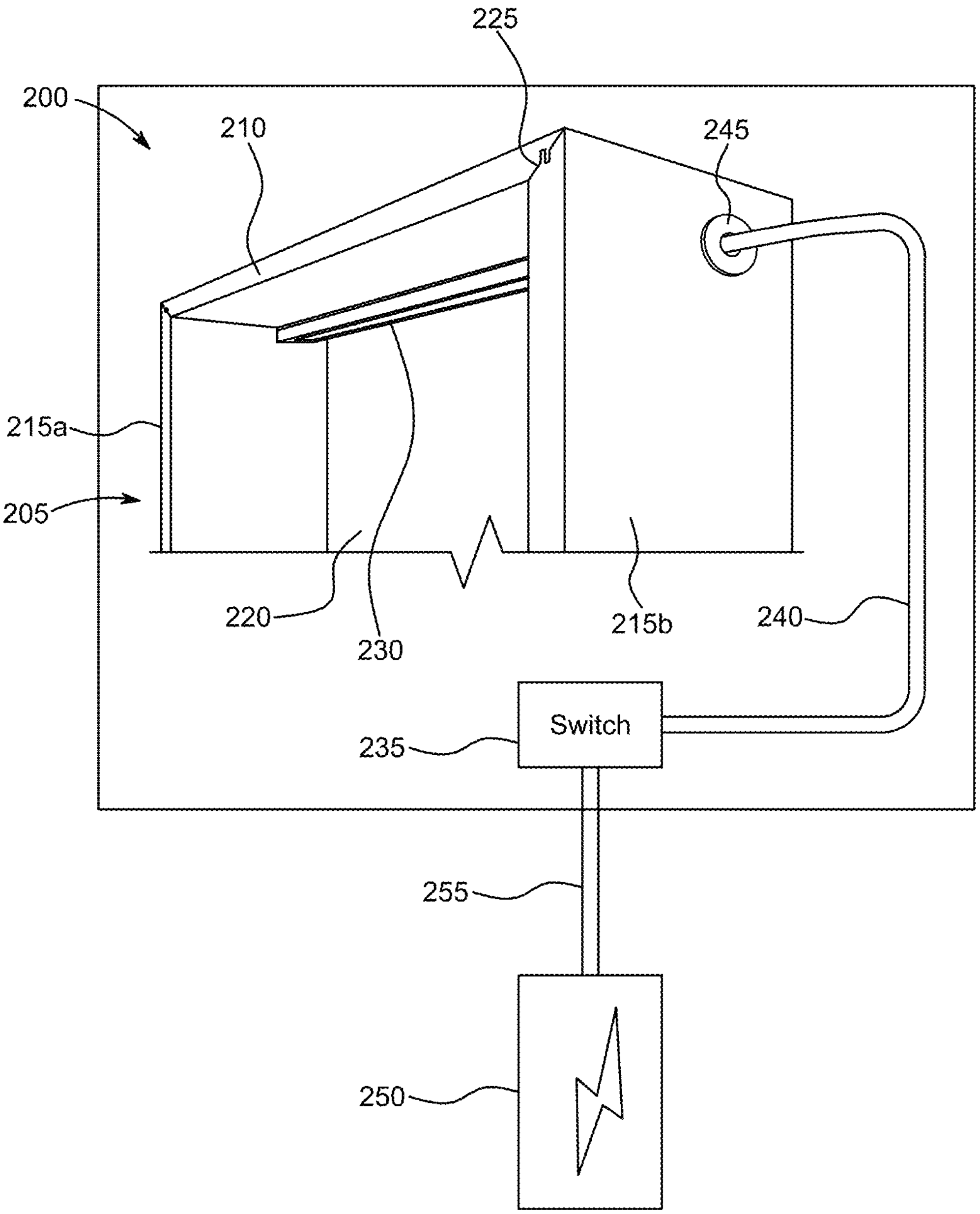
FIG. 2 depicts an example shower niche assembly in accordance with the present disclosure.

FIG. 2 depicts an example shower niche assembly 200 (or assembly 200) in accordance with the present disclosure. The assembly 200 may be same as the shower niche assembly described above in conjunction with FIG. 1. While describing FIG. 2, references may be made to FIGS. 3 and 4.

The assembly 200 may include a cabinet 205 that may be same as the cabinet 130. As described above in conjunction with FIG. 1, the cabinet 205 may be rectangular or may have any other shape. The cabinet 205 may be made of waterproof or water-resistant material such as plastic or fiber, thus enabling the assembly 200 to withstand higher moisture level of the shower 100. Further, the cabinet 205 may be of any dimension or design, based on user requirements and/or shower dimensions. The contractor may easily insert the cabinet 205 into a recess (e.g., a niche) on a wall and securely affix the cabinet 205 to the recess.

In an exemplary aspect, the cabinet 205 may include a top wall 210, sidewalls 215*a*, 215*b*, a back wall 220, and a bottom wall (not shown). The top wall 210 and the sidewalls 215*a*, 215*b* may be attached to each other via a tongue-and-groove structure 225 and adhesive. Similarly, the bottom wall may be attached to the sidewalls 215*a*, 215*b* via a tongue-and-groove structure and adhesive. A person ordinarily skilled in the art may appreciate that the tongue-and-groove structure 225 enables secure and robust attachment between two walls, especially when the walls may be inclined at an angle (e.g., 90 degrees for a rectangular cabinet 205).

The assembly 200 may further include a lighting fixture 230 that may be removably attached to the cabinet 205. The lighting fixture 230 may be same as the lighting fixture 140 described above in conjunction with FIG. 1 and may include one or more LEDs or an array of LEDs. In the exemplary aspect depicted in FIG. 2, the lighting fixture 230 may be removably attached to an interior surface of the top wall 210. Example lighting fixture arrangement depicted in FIG. 2 should not be construed as limiting and the lighting fixture 230 may be removably attached anywhere in the cabinet 205 without departing from the present disclosure scope.

In some aspects, the lighting fixture 230 may be shaped as a cuboid and may include an array of LEDs. Length of cuboidal lighting fixture may be equivalent to a top wall length or may be less than the top wall length. Further, one or more LEDs of the array of LEDs may be configured to illuminate when a low-power DC power may be supplied to the lighting fixture 230. For example, the array of LEDs may illuminate when 12 Volt (V) or 24 V DC power may be supplied to the lighting fixture 230.

The lighting fixture 230 may be electrically coupled to a switch 235 via a wire 240. The switch 235 may be same as the switch 135 described above in conjunction with FIG. 1. The switch 235 and the wire 240 may be part of the assembly 200. The wire 240 may be an insulated wire that may be configured to transfer 12 or 24 V DC power from the switch 235 to the lighting fixture 230. In some aspects, a lighting fixture edge (not shown) may be connected to one end of the wire 240, and another end of the wire 240 may be connected to the switch 235. The sidewall 215*b* may include a hole through which the wire 240 may pass, thus connecting the lighting fixture 230 to the switch 235. In some aspects, the hole in the sidewall 215*b* may be covered by a grommet 245 by the contractor when the wire 240 may passed through the hole. The grommet 245 may make the hole water-proof and passage of the wire 240 through the hole secure.

In addition to being electrical coupled with the lighting fixture 230 via the wire 240, the switch 235 may be electrically coupled to an external power source 250 (e.g., a utility power source) via a wire 255. The power source 250 may be configured to supply a high-voltage AC power (e.g., 120 V AC power) to the switch 235. The switch 235 may be configured to receive the 120 V AC power from the power source 250, and may convert the AC power to DC power and step-down the voltage to transfer 12 V or 24 V DC power to the lighting fixture 230 via the wire 240. Structural and functions details of the switch 235 are described below in conjunction with FIGS. 3 and 4.

Figure 3:
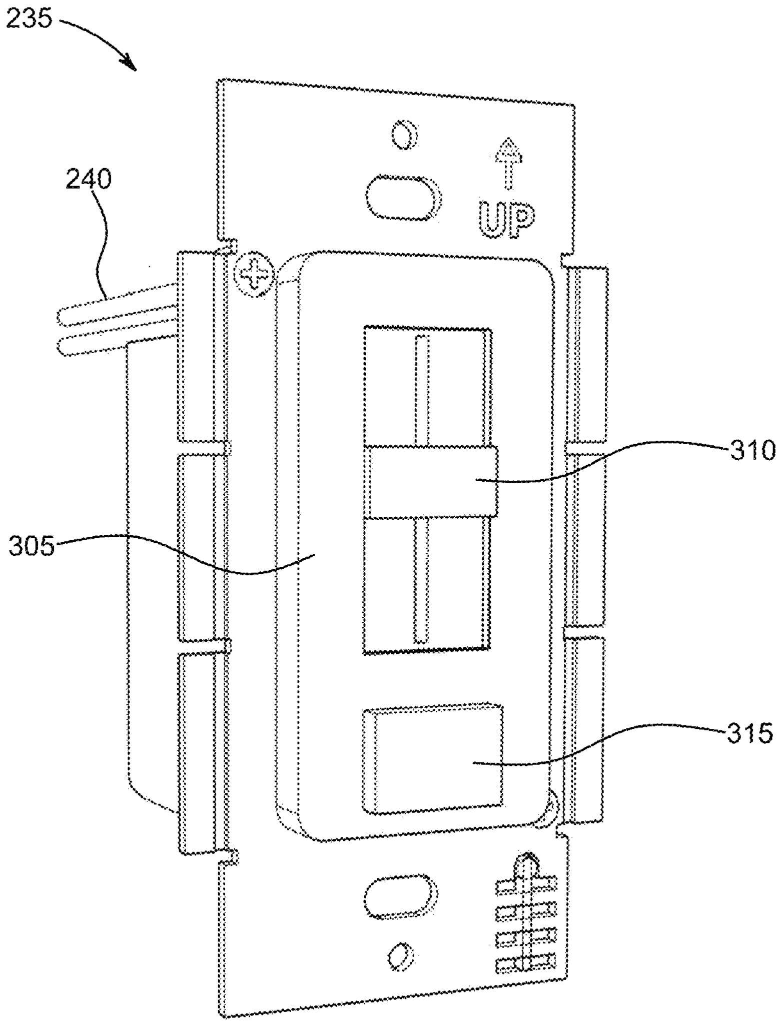
FIG. 3 depicts a front isometric view of a switch in accordance with the present disclosure.
Figure 4:
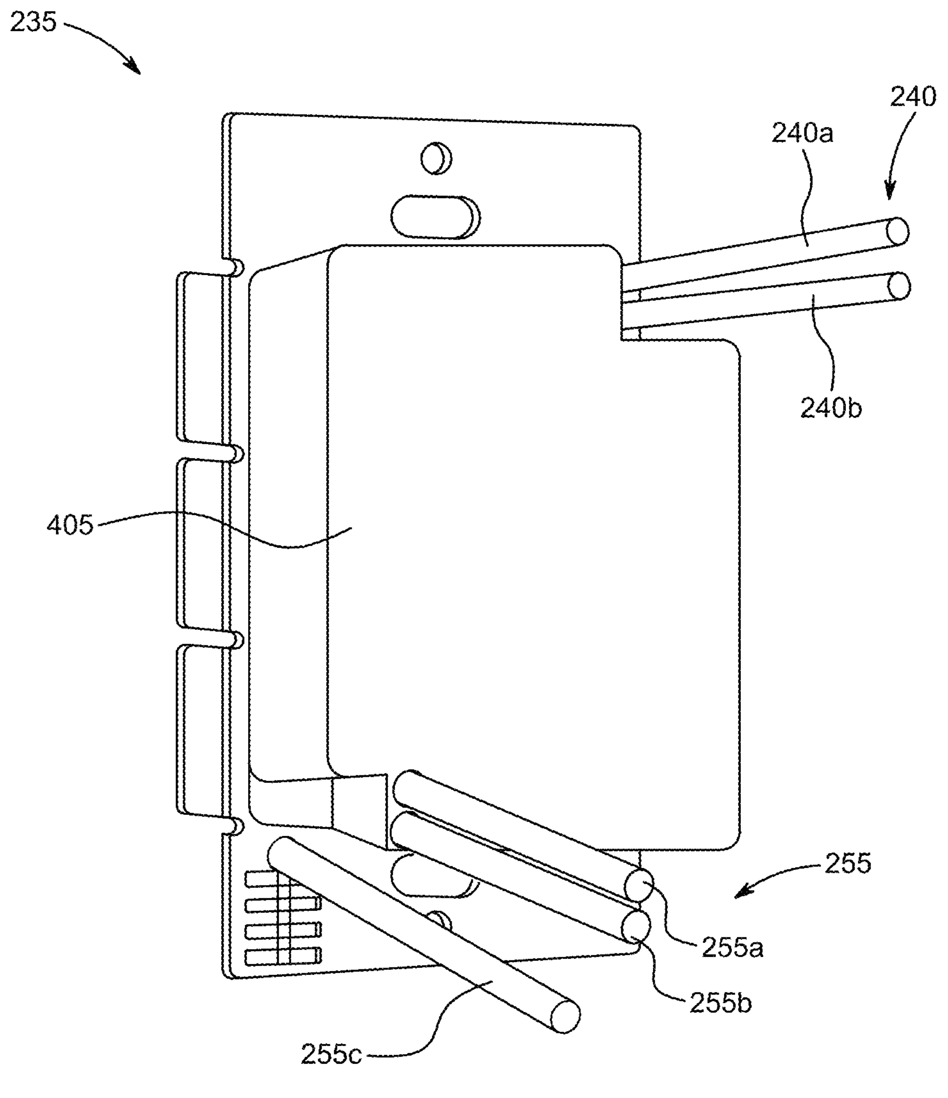
FIG. 4 depicts a back isometric view of a switch in accordance with the present disclosure.

FIGS. 3 and 4 depict front and back isometric views of the switch 235, respectively. The switch 235 may include a control unit 305 (as shown in FIG. 3) that may be disposed at a switch front portion. The switch 235 may further include a built-in transformer 405 (or driver/converter, as shown in FIG. 4) that may be disposed at a switch back portion.

The transformer 405 may be configured to receive 120 V AC power from the power source 250 via the wire 255. As depicted in FIG. 4, the wire 255 may include a first wire 255*a*, a second wire 255*b* and a third wire 255*c*. The first, second and third wires 255*a*, 255*b*, 255*c* may be hot, neutral and ground wires. Responsive to receiving the 120 V AC power from the power source 250, the transformer 405 may convert the received AC power into DC power and may step-down the power to 12 V or 24 V (depending on operating voltage of LEDs of the lighting fixture 230). The transformer 405 may then supply the 12 V or 24 V DC power to the lighting fixture 230 via the wire 240 to enable lighting fixture (or LED) illumination. As depicted in FIG. 4, the wire 240 may include a first wire 240*a* and a second wire 240*b* that may be positive and ground wires.

In some aspects, the first, second and third wires 255*a*, 255*b*, 255*c*, and the first and second wires 240*a*, 240*b* may be color-coded to enhance contractor's ease of installation. For example, the first wire 240*a* may be colored red and the second wire 240*b* may be colored blue. Similar color-coded wires may be connected to the lighting fixture, so that the contractor may attach blue-colored switch wire with blue-colored lighting fixture wire, and red-colored switch wire with red-colored lighting fixture wire to conveniently connect the switch 235 with the lighting fixture 230.

The control unit 305 may be configured to control lighting fixture activation. Specifically, the user may control a lighting fixture (or LED) illumination intensity and a lighting fixture (or LED) activation via the control unit 305. In an exemplary aspect, the control unit 305 may include a slidable dimming unit 310 and an activation unit 315. The activation unit 315 may be an ON/OFF switch and the user may switch ON or OFF the lighting fixture 230 (or the LEDs) by using/pressing the activation unit 315. The slidable dimming unit 310 may enable the user to change luminosity of the LEDs in the lighting fixture 230. For example, the user may slide the dimming unit 310 "up" to increase LED/lighting fixture illumination intensity and may slide the dimming unit 310 "down" to decrease LED/lighting fixture illumination intensity.

The control unit 305 may include one or more additional units that are not depicted in FIG. 3. For example, the control unit 305 may include an LED temperature control switch that may enable the user to switch between warm and cool temperature lighting or change LED color. The control unit 305 may alternatively or additionally include a touchscreen user interface in which the user may input lighting fixture operational settings. For example, the user may input settings associated with LED illumination intensity, temperature, activation time duration, and/or the like on the touchscreen user interface. In some aspects, the switch 235 may additionally include a built-in timer (not shown) that may record illumination time duration of LEDs, and activate or deactivate the LEDs based on the activation time duration settings input by the user.

As described above in conjunction with FIG. 1, the switch 235 may be installed anywhere in the shower 100 by the contractor, based on user's requirements/preferences. When the control unit 305 includes the touchscreen user interface, the switch 235 may further include proximity sensors that may illuminate the touchscreen user interface when the user approaches in proximity to the switch 235, thus enabling the user to conveniently input the lighting fixture operational settings.

Although FIG. 2 depicts the lighting fixture 230 being removably affixed to the interior surface of the top wall 210, the present disclosure is not limited to the arrangement depicted in FIG. 2. For example, the lighting fixture 230 may be affixed to the back wall 220, the sidewalls 215*a*, 215*b*, the bottom wall, and/or the like. In some aspects, the back wall 220 may be semi-opaque and the lighting fixture 230 may be attached behind the back wall 220 such that an entire back wall area (or entire cabinet back surface area) or a portion of the back wall area may be illuminated when the lighting fixture 230 may be illuminated.

Further, the cabinet 205 may include one or more adjustable horizontal shelves that may be removably attached between the sidewalls 215*a*, 215*b* (in addition to the top wall 210 and the bottom wall). The contractor may attach the horizontal shelves between the sidewalls 215*a*, 215*b* by using adhesives, fasteners, and/or the like. The contractor may additionally attach the lighting fixture 230 to one or more horizontal shelves to further illuminate the cabinet 205. In some aspects, the horizontal shelves may be adjustable along the length of the sidewalls 215*a*, 215*b*, such that the contractor may attach the horizontal shelves at any position on the sidewalls 215*a*, 215*b*.

Figure 5:
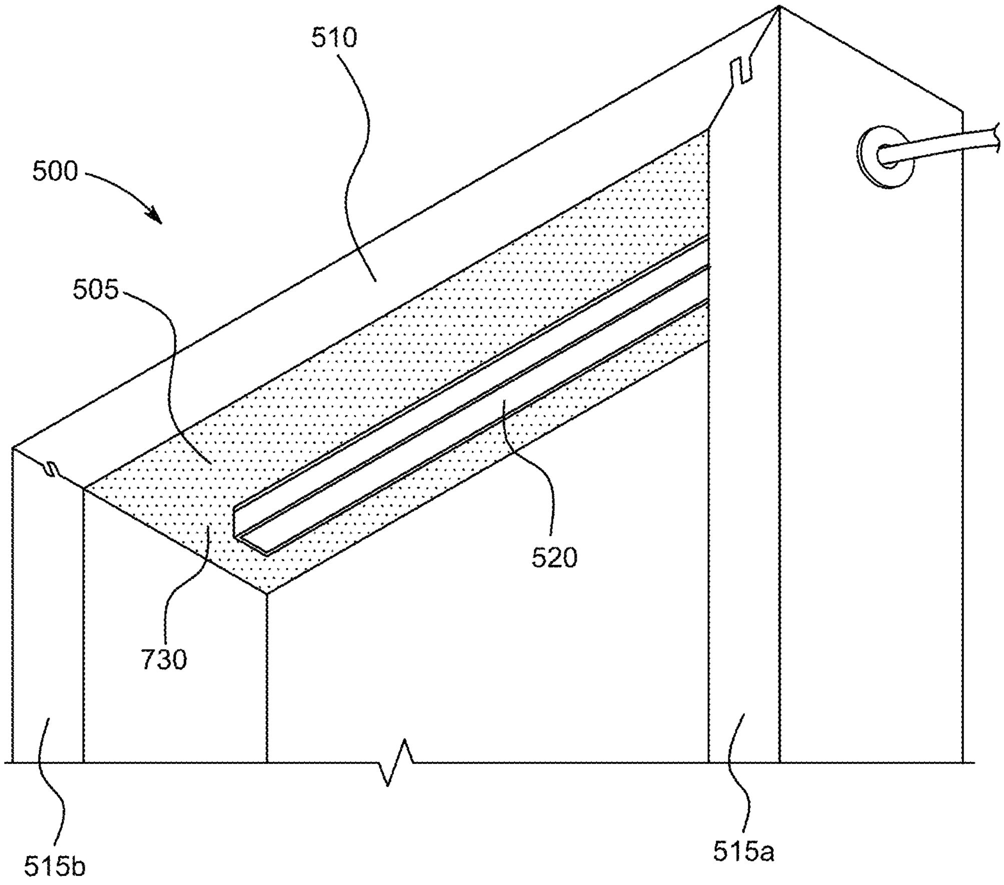
FIG. 5 depicts a cabinet with a magnetic attachment mechanism in accordance with the present disclosure.

FIG. 5 depicts a cabinet 500 with a magnetic attachment mechanism 505 in accordance with the present disclosure. The cabinet 500 may be same as the cabinet 205. The cabinet 500 may include a top wall 510, sidewalls 515*a*, 515*b* and a bottom wall (not shown). The cabinet 500 may additionally include one or more horizontal shelves (not shown) attached between the sidewalls 515*a*, 515*b*.

In the exemplary aspect depicted in FIG. 5, an interior surface of the top wall 510 may include the magnetic attachment mechanism 505, which may be magnetic strip or plate that may be attached to the top wall interior surface. A lighting fixture 520 may be magnetically coupled with the magnetic attachment mechanism 505. The lighting fixture 520 may be same as the lighting fixture 230.

In the aspect depicted in FIG. 5, a back surface of the lighting fixture 520 may also include a magnetic material or a ferrous metal, which may enable the lighting fixture 520 to be removably attached to the magnetic attachment mechanism 505 (or the top wall 510). Since the lighting fixture 520 may be removably attached to the top wall 510 via the magnetic attachment mechanism 505, the contractor may attach the lighting fixture 520 at any "depth" inside the cabinet 500 on the top wall 510.

Although FIG. 5 depicts an aspect where the magnetic attachment mechanism 505 (and hence the lighting fixture 520) is attached to the top wall 510, the present disclosure is not limited to the arrangement depicted in FIG. 5. For example, the magnetic attachment mechanism 505 (and hence the lighting fixture 520) may be attached to the sidewalls 515*a*, 515*b*, the bottom wall, cabinet back wall or one or more horizontal shelves, without departing from the present disclosure scope.

Remaining elements/units depicted in FIG. 5 are same as respective elements/units of the assembly 200, and hence are not described again here for the sake of simplicity and conciseness.

Figure 6:
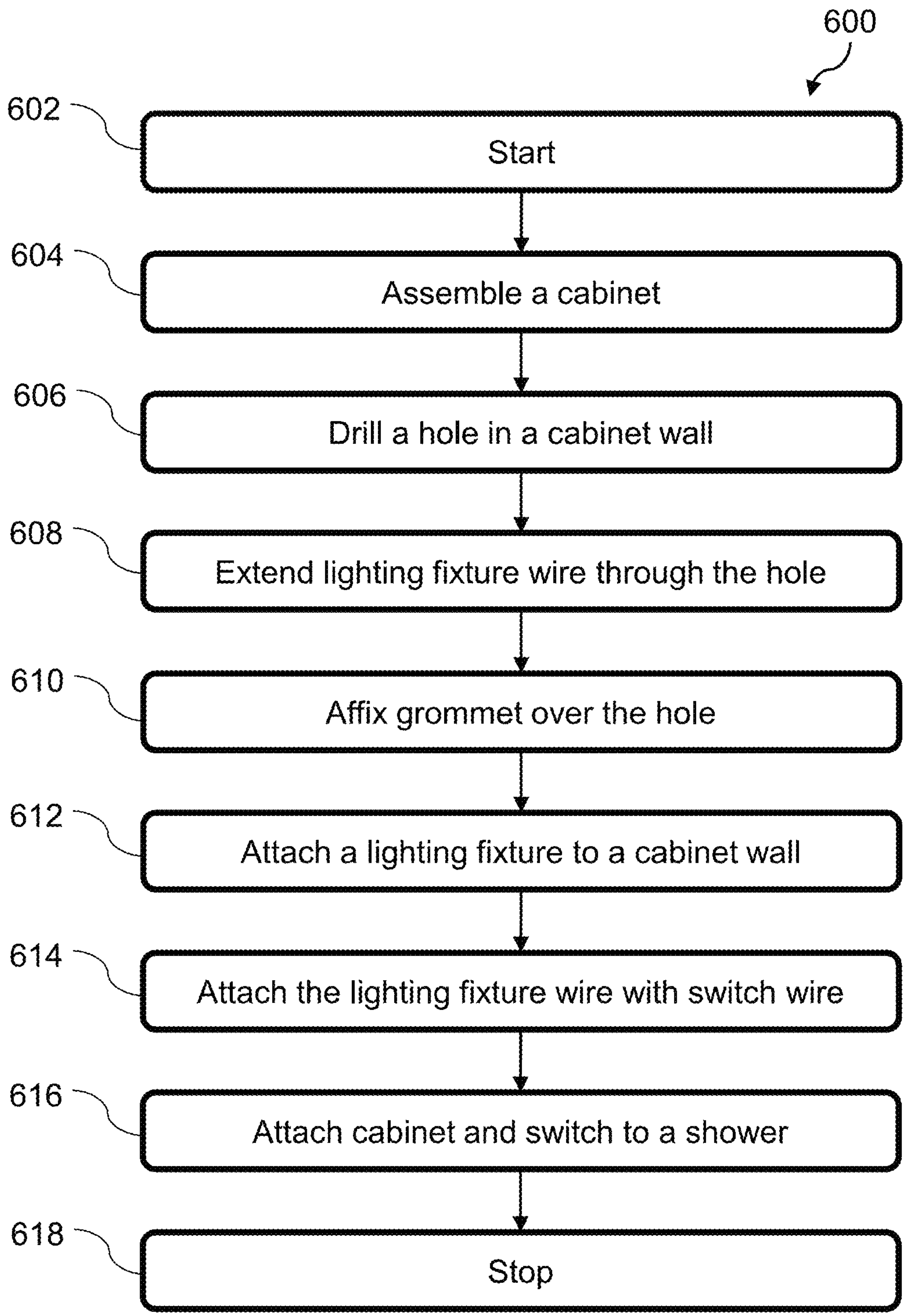
FIG. 6 depicts a flow diagram of a method for installing a shower niche assembly in a shower in accordance with the present disclosure.

FIG. 6 depicts a flow diagram of an example method 600 for installing a shower niche assembly in a shower in accordance with the present disclosure. FIG. 6 may be described with continued reference to prior figures. The following process is exemplary and not confined to the steps described hereafter. Moreover, alternative embodiments may include more or less steps that are shown or described herein and may include these steps in a different order than the order described in the following example embodiments.

The method 600 starts at step 602. At step 604, the method 600 may include assembling the cabinet 205 as per user's requirements by using the tongue-and-groove structure 225 and adhesives. At step 606, the method 600 may include drilling a hole in one or more cabinet walls (e.g., the sidewall 215*b*) for a lighting fixture wire. At step 608, the method 600 may include extending the lighting fixture wire through the hole. At step 610, the method 600 may include affixing the grommet 245 over the hole to make the hole water-proof and secure.

At step 612, the method 600 includes attaching the lighting fixture 230 to the top wall 210 via the magnetic attachment mechanism 505. At step 614, the method 600 may include attaching the lighting fixture wire with the switch wire, e.g., the wire 240. At step 616, the method 600 includes attaching the cabinet 205 and the switch 235 to one or more locations in the shower 100 based on user's requirements or preferences. At step 618, the method 600 ends.

Figure 7:
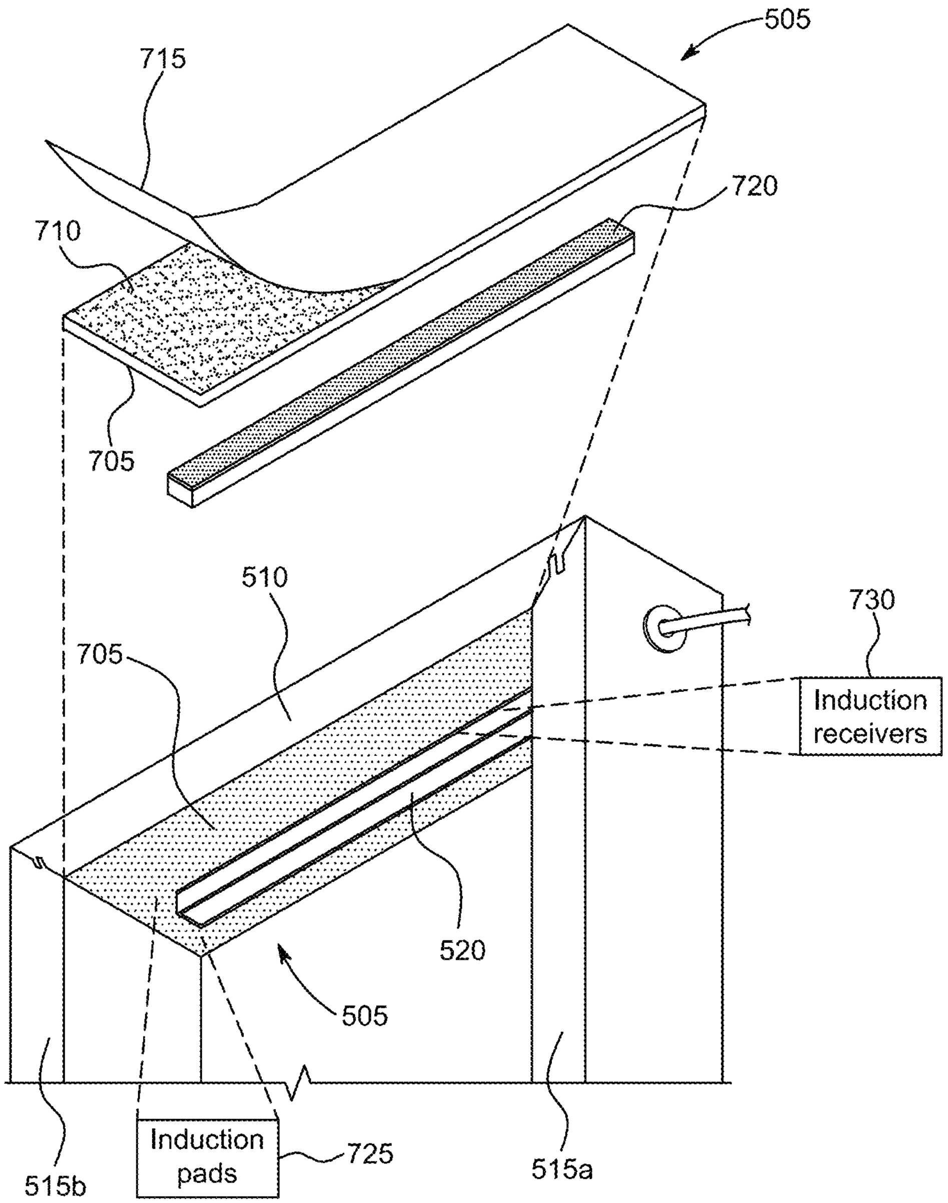
FIG. 7 depicts a view of a magnetic attachment mechanism and a lighting fixture of a shower niche assembly in accordance with the present disclosure.

FIG. 7 depicts a view of the magnetic attachment mechanism 505 and the lighting fixture 520 of the shower niche assembly in accordance with the present disclosure. In the example aspect depicted in FIG. 7, the magnetic attachment mechanism 505 is a magnetic strip (hereinafter referred to as magnetic strip 505) that includes a front surface 705 and a back surface 710. The back surface 710 may include an attachment mechanism, which may be, for example, an adhesive. An operator may attach the back surface 710 to the interior surface of the top wall 510 via the adhesive. In some aspects, the back surface 710 may include a peel off cover 715 that may removably cover the back surface 710. Before attaching the back surface 710 to the top wall 510, the operator may remove the peel off cover 715 and then attach the back surface 710 to the top wall 510 via the adhesive present on the back surface 710.

As described above in conjunction with FIG. 5, a back surface 720 of the lighting fixture 520 may be a magnetic or ferrous surface, which may be made of or include magnetic or ferrous material. The lighting fixture's back surface 720 may magnetically couple with the magnetic strip's front surface 705 when the operator brings the lighting fixture 520 in proximity to the magnetic strip 505, thereby enabling magnetic attachment between the lighting fixture 520 and the magnetic strip 505 (which may itself be adhered to the top wall 510 via the adhesive present on the back surface 710, as described above).

In some aspects, the magnetic strip 505 may be rectangular in shape (with or without tapered corners) and may be waterproof. Specifically, since the magnetic strip 505 is designed to be adhered to a shower niche's cabinet wall (e.g., the top wall 510), the magnetic strip 505 is made of a material that can withstand a high humidity or moisture environment (e.g., a shower).

In an exemplary aspect, a thickness of the magnetic strip 505 may be approximately 1/16 inch, without the peel-off cover 715. The thickness of the magnetic strip 505 may be approximately ⅛ inch, with the peel-off cover 715. The magnetic strip 505 may have a width in a range of 2-5 inches, and a length that may be dependent on the length of the cabinet wall (e.g., the top wall 510) on which the magnetic strip 505 may be attached.

In further aspects, the magnetic strip 505 may include one or more induction pads 725 and the lighting fixture 520 may include one or more induction power receivers 730 (or induction receivers 730). The induction pads 725 and the induction receivers 730 may include conductor coils (not shown), which may enable power transfer via induction between the induction pads 725 and the induction receivers 730. In this case, the induction pads 725 may be connected with a utility power source (e.g., the power source 250), which may provide electric power to the induction pads 725. The induction pads 725 may transfer the received electric power wirelessly via induction to the induction receivers 730, thereby enabling activation of the lighting fixture 520. Stated another way, in this case, the lighting fixture 520 may receive electric power wirelessly from the magnetic strip 505 via the induction pads 725 and the induction receivers 730. The induction receivers 730 may receive electric power wirelessly from the induction pads 725 when the induction receivers 730 are disposed within a predefined distance of the induction pads 725 (or when the lighting fixture 520 is magnetically attached to the magnetic strip 505).

It may be appreciated that since the lighting fixture 520 receives electric power wirelessly via induction, the lighting fixture 520 is not required to have any wires (which makes the assembly easier to handle, install and/or operate).

Although the description above is related to an embodiment where the lighting fixture 520 receives electric power wirelessly via indication, the present disclosure is not limited to such an embodiment. In additional embodiments, the lighting fixture 520 may receive electric power via direct wiring as well through the harness, as described below in conjunction with FIG. 8.

Figure 8:
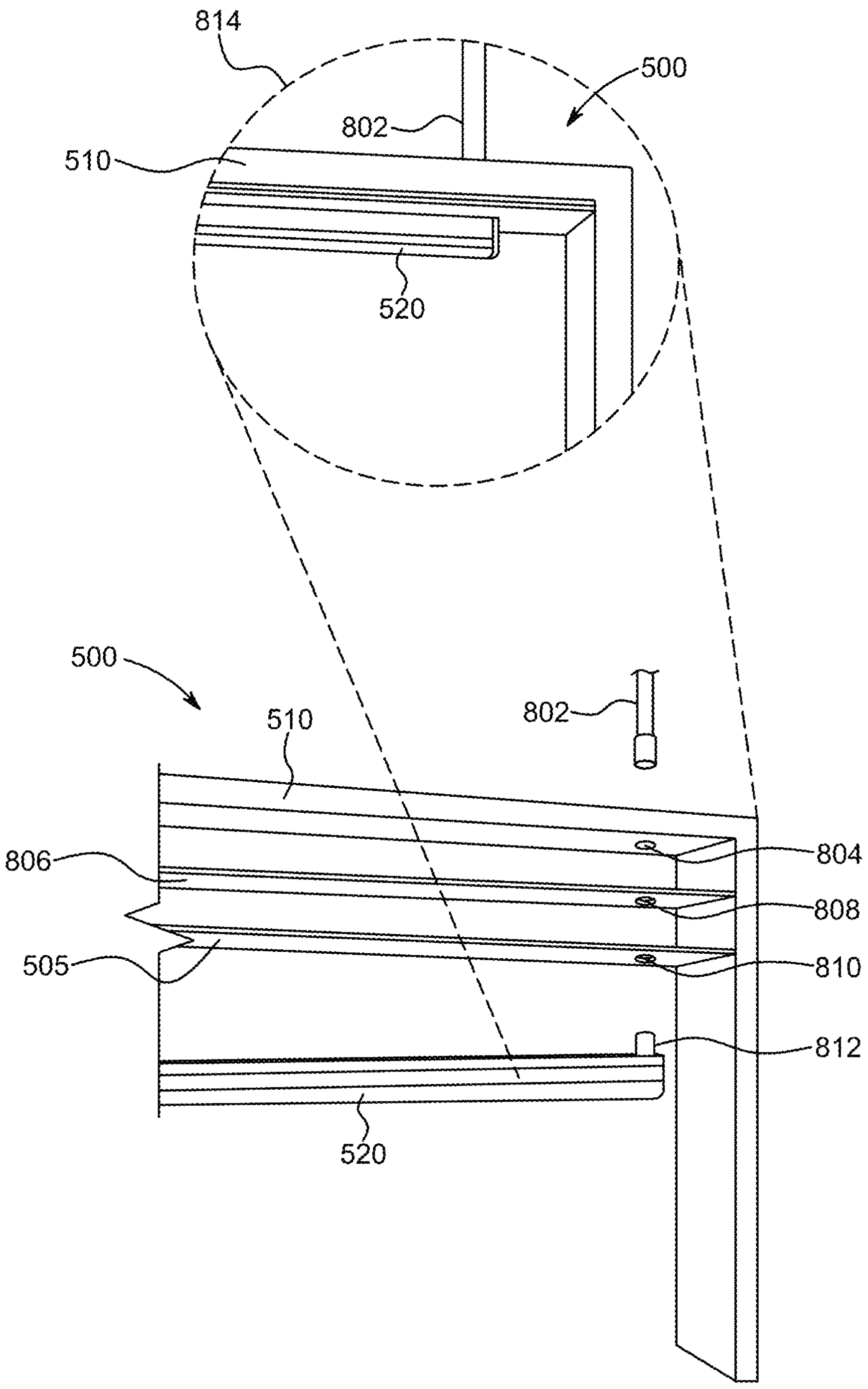
FIG. 8 depicts a view of a wiring harness clipping directly inserted into a top of a niche creating a permanent connection, thereby eliminating the need for an outside electrical power connection in a gang box.

FIG. 8 depicts a view of a wiring harness clipping directly inserted into the top wall 510 of the cabinet 500 creating a permanent connection, thereby eliminating the need for an outside electrical power connection in a gang box. The wiring harness clipping may include a clip-in plug 802 that may be connected to an end of a low voltage wire (not shown).

The clip-in plug 802 may be inserted into the top wall 510 (e.g., via a through-hole 804 located in the top wall 510). The arrangement depicted in FIG. 8 further includes a high bonding double sided adhesive sheet 806 that may bond the top wall 510 and the magnetic strip 505. The sheet 806 may be disposed between the top wall 510 and the magnetic strip 505, as shown in FIG. 8. The sheet 806 may include a second through-hole 808 and the magnetic strip 505 may include a third through-hole 810. Both these through-holes 808, 810 may be aligned with the through-hole 804 present on the top wall 510.

The lighting fixture 520 (or aluminum light channel) may include a receiving plug 812 that may be complementary in shape to the clip-in plug 802. Further, the receiving plug 812 may be aligned with the through-holes 804, 808 and 810.

During operation, an operator may attach the top surface of the lighting fixture 520 (which may include a magnetic layer) with the bottom surface of the magnetic strip 505. The operator may further attach the top surface of the magnetic strip 505 with the bottom surface of the sheet 806. The operator may further attach the top surface of the sheet 806 with the bottom surface of the top wall 510. The operator may then insert the clip-in plug 802 via the through-hole 804 and attach it to the receiving plug 812 (via the through-holes 808 and 810). The clip-in plug 802 may carry a low voltage wire that may power the lighting fixture 520. In this manner, the lighting fixture 520 is powered via a wired connection. A view 814 of FIG. 8 depicts a fully assembled niche assembly including the clip-in plug 802.

In some aspects, the lighting fixture 520 may be positioned anywhere on the magnetic strip 505 prior to drilling the through-holes 804, 808 and 810. Magnetic coupling allows for serviceability of the lighting fixture 520.

Further innovations may be incorporated into the niche assembly described above. For example, motion detectors may be incorporated into the niche assembly that may activate the lighting fixture 520 when a motion is detected. Further, a wall dimmer switch can be incorporated that may tune between multiple colors and temperatures (i.e., RGBW and/or 3000K/4000K). This wall dimmer switch may be a touch screen switch.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:

a magnetic strip comprising a front surface and a back surface, wherein:

the back surface comprises an attachment mechanism, and the back surface is configured to be attached to a wall of a cabinet associated with a shower niche assembly, via the attachment mechanism; and a lighting fixture comprising a magnetic or ferrous surface, wherein the magnetic or ferrous surface is configured to magnetically couple with the front surface.

2. The system of claim 1, wherein the attachment mechanism is an adhesive.

3. The system of claim 1, wherein the magnetic strip is waterproof.

4. The system of claim 1, wherein the lighting fixture comprises one or more Light Emitting Diodes (LEDs).

5. The system of claim 1, wherein the magnetic strip further comprises a peel off cover removably covering the back surface.

6. The system of claim 1, wherein the magnetic strip is rectangular.

7. The system of claim 1, wherein the magnetic strip further comprises one or more induction pads.

8. The system of claim 7, wherein the one or more induction pads are connected with a utility power source and configured to receive electric power from the utility power source.

9. The system of claim 7, wherein the lighting fixture further comprises one or more induction power receivers, and wherein the lighting fixture is configured to receive electric power wirelessly from the magnetic strip via the one or more induction pads and the one or more induction power receivers.

10. The system of claim 9, wherein the one or more induction power receivers are configured to receive electric power wirelessly from the one or more induction pads when the one or more induction power receivers are disposed within a predefined distance of the one or more induction pads.

11. A system comprising:

a magnetic strip comprising a front surface and a back surface, wherein:

the back surface comprises an adhesive, and the back surface is configured to be attached to a wall of a cabinet associated with a shower niche assembly, via the adhesive;

a peel off cover removably covering the back surface; and a lighting fixture comprising a magnetic or ferrous surface, wherein the magnetic or ferrous surface is configured to magnetically couple with the front surface.

12. The system of claim 11, wherein the magnetic strip is waterproof.

13. The system of claim 11, wherein the magnetic strip further comprises one or more induction pads.

14. The system of claim 13, wherein the one or more induction pads are connected with a utility power source and configured to receive electric power from the utility power source.

15. The system of claim 13, wherein the lighting fixture further comprises one or more induction power receivers, and wherein the lighting fixture is configured to receive electric power wirelessly from the magnetic strip via the one or more induction pads and the one or more induction power receivers.

16. The system of claim 15, wherein the one or more induction power receivers are configured to receive electric power wirelessly from the one or more induction pads when the one or more induction power receivers are disposed within a predefined distance of the one or more induction pads.

17. The system of claim 11, wherein the lighting fixture comprises one or more Light Emitting Diodes (LEDs).

18. The system of claim 11, wherein the magnetic strip is rectangular.

19. A shower niche assembly comprising:

a cabinet for the shower niche assembly;

a magnetic strip comprising a front surface and a back surface, wherein:

the back surface comprises an adhesive, and the back surface is configured to be attached to a cabinet wall, via the adhesive; and a lighting fixture comprising a magnetic or ferrous surface, wherein the magnetic or ferrous surface is configured to magnetically couple with the front surface.

* * * * *